3,769,274
AMINOPHENYL-CYCLOAMIDINES
Hartmund Wollweber, Wuppertal-Elberfeld, Germany, and Winfried Flucke, Beenleigh, Queensland, Australia, assignors to Bayer Aktiengesellschaft, Leverkusen, Germany
No Drawing. Filed June 9, 1971, Ser. No. 151,576
Claims priority, application Germany, June 13, 1970, P 20 29 297.1
Int. Cl. C07d 27/04, 41/08, 29/12
U.S. Cl. 260—239 BF          27 Claims

ABSTRACT OF THE DISCLOSURE

Derivatives of 2-[4-(substituted amino) aminophenylimino] pyrrolidine, -piperidine or hexahydroazepine, optionally bearing alkyl or alkenyl substitution in the 1-position of the specified heterocyclic groups, are anthelmintics. A number of processes for the preparation of these compounds, of which 2-(4-carbethoxyaminophenylimino)-1-methylpyrrolidine is a typical embodiment, are disclosed.

---

The present invention relates to certain new aminophenyl-cycloamidines and their salts, to processes for their production, and to their use in medicine, especially as parasiticides and hypotensive agents.

Cyclic phenylamidines, such as 2-(3,4-dichlorophenylimino)-N-methylpyrrolidine, are already known (U.S. Pat. No. 3,189,698). These compounds are, however, inactive against helminths. Furthermore, pharmacodynamically active phenylcycloamidines are known, such as 2-(2,6-dichlorophenylimino)-pyrrolidine (Netherlands patent specification No. 6805573). In these compounds, however, the pharmacodynamic activity, such as lowering of blood pressure, hyperglycaemic activity and inhibitory action on the central nervous system, is specifically linked to the o-substitution of the phenyl nucleus.

Other 2-phenyliminopyrrolines substituted in the m- and p-position, for example by chlorine or other halogen atoms, or by an alkyl, nitro or alkoxy group, are pharmacodynamically inactive.

The present invention provides aminophenylcycloamidines of the general formula:

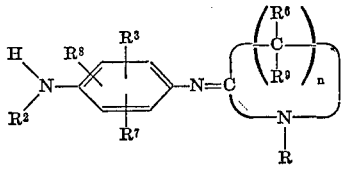

(1)

in which

R is a hydrogen atom or a straight or branched chain alkyl, alkenyl or alkynyl group, which can be substituted by a halogen atom or an alkoxy or hydroxy group;

$R^2$ is a —$COR^4$ or —$SO_2R^5$ group in which $R^4$ is a hydrogen atom; a straight or branched chain alkyl, alkenyl, alkynyl, alkoxy, alkenyloxy, alkynyloxy alkoxyalkyloxy or alkoxy group, which can be substituted by a chlorine atom or by a hydroxy, cyano or oxo group; a cycloalkyl group or a cycloalkenyl group containing one or two double bonds, which groups can be substituted by one or more alkyl groups; a cycloalkylalkyl, tetrahydrofurfuryl, tetrahydrofuryl or tetrahydropyranyl group which can be substituted by one or more alkyl groups; a trifluoromethyl group; a carbalkoxyalkyl group; a cycloalkylalkoxy, cycloalkoxy, or tetrahydrofurylalkoxy group; a phenalkoxy, phenoxyalkoxy, phenoxy, phenylalkyl, phenyl or naphthyl group, the aromtaic ring of which can be substituted by one or more alkyl, alkenyl, alkoxy, nitro, trifluoromethyl, cyano, alkylsulphonyl, acylamino and/or alkylsulphonylamino groups and/or halogen atoms; or a heteroaromatic O- or N-containing ring system;

$R^5$ is a straight or branched chain alkyl or alkenyl group; a cycloalkyl group; a phenylalkyl, phenyl or naphthyl group, the aromatic ring of which can be substituted by one or more alkyl, alkenyl, alkoxy, nitro, trifluoromethyl, cyano, acylamino, alkylsulphonyl and/or alkylsulphonylamino groups and/or chlorine, bromine or fluorine atoms;

$R^3$, $R^7$ and $R^8$, which can be the same or different, are each a hydrogen or halogen atom or a straight or branched-chain alkyl, alkenyl or alkoxy group or a cyano or trifluoromethyl group;

$R^6$ and $R^9$ which can be the same or different, are each a hydrogen atom or an alkyl group; and $n$ is 3, 4 or 5;

and their salts.

These compounds are suitable for combatting parasites, particularly helminths, in human and veterinary medicine. In addition, some of them are pharmacodynamically active, lowering the blood pressure in rats with hyptertension induced by gold leaf. The use of these compounds as hypotensive agents is therefore possible.

The new active compounds according to the invention are basic in character. They can be used as free bases or as their salts, for example hydrochlorides, sulphates, phosphates, nitrates, acetates and naphthalene-disulphonates.

Alkyl groups R generally contain 1 to 5, preferably 1 to 4, carbon atoms, and alkenyl and alkynyl groups R generally contain 2 to 5, preferably 2 to 4, carbon atoms. Possible substituents in these groups are one or more, preferably 1 or 2, halogen atoms such as for example, fluorine, chlorine and bromine, alkoxy groups with 1 to 4, preferably 1 or 2, carbon atoms, and hydroxyl groups.

Alkyl groups $R^3$, $R^7$ and $R^8$, as well as the alkyl parts of the alkoxy groups $R^3$, $R^7$ and $R^8$, generally contain 1 to 4 preferably 1 or 2, carbon atoms. The alkenyl groups $R^3$, $R^7$ and $R^8$ generally contain 2 to 4 carbon atoms. Halogen atoms $R^3$, $R^7$ and $R^8$ are generally fluorine, chlorine and bromine.

Alkyl, alkyloxy, alkoxyalkyloxy and alkoxyalkyl groups $R^4$ contain preferably 1 to 6, especially 1 to 4, carbon atoms per alkyl part. Alkenyl, alkynyl, alkenyloxy and alkynyloxy groups $R^4$ preferably contain 2 to 6, especially 2 to 4, carbon atoms. Cycloalkyl groups $R^4$, as well as the rings of the cycloalkylalkyl groups of the cycloalkoxy groups and cycloalkylalkoxy groups $R^4$ generally contain 3 to 7, preferably 5 or 6, ring members. The cycloalkyl rings, and the cycloalkyl parts of the cycloalkylalkyl radicals $R^4$, can be substituted by one or more, preferably 1 or 2, alkyl groups with 1 to 4, preferably 1 or 2, carbon atoms. The alkyl parts and/or the alkoxy parts of the cycloalkylalkyl, cycloalkyl-alkoxy and cycloalkoxy groups mentioned under $R^4$, as well as of the carboethoxyalkyl groups, tetrahydrofurylalkoxy group, phenalkoxy group, phenoxyalkoxy group and phenylalkyl group in each case generally contain 1 to 5, preferably 1 or 2, carbon atoms. Where these radicals contain aromatic components, the latter can, inter alia, be substituted by one or more, preferably 1 or 2, of the following radicals: alkyl, alkoxy, alkylsulphonyl, acylamino and alkylsulphonylamino groups, preferably having 1 to 4, especially 1 or 2, carbon atoms, and alkenyl groups preferably having 2 to 4 carbon atoms. The furyl, pyridyl, isoxazolyl, pyrimidinyl, imidazolyl, pyrazolyl or indolyl group may for example be mentioned as heteroaromatic O-containing or N-containing ring systems $R^4$.

Alkyl groups $R^5$ generally contain 1 to 6, preferably 1 or 2, carbon atoms, and alkenyl groups $R^5$ generally contain 2 to 6 carbon atoms. Cycloalkyl groups $R^5$ possess 3 to 7, preferably 5 or 6, ring members. The alkyl part of the phenylalkyl group $R^5$ preferably contains 1 to 4, especially 1 or 2, carbon atoms. The aromatic parts of the radicals listed under $R^5$ can carry one or more, preferably 1 or 2, substituents. If alkyl, alkoxy, acylamino, alkylsulphonyl or alkylsulphonylamino groups are present as substituents, these radicals generally contain 1 to 6, preferably 1 to 4, carbon atoms. If one or more alkenyl groups are present as the substituents, these contain 2 to 6 carbon atoms.

Alkyl groups $R^6$ and $R^9$ generally contain 1 to 6, preferably 1 to 4, carbon atoms.

A preferred group of the aminophenyl-cycloamidines of the invention are those of the general formula:

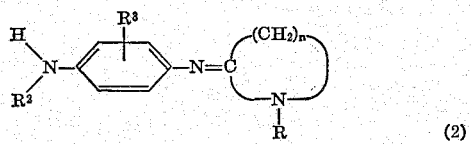

(2)

in which

R is a straight or branched chain alkyl group with up to 4 carbon atoms or a straight or branched chain alkenyl group with 2 to 4 carbon atoms, which groups can be substituted by a chlorine atom or a hydroxy or methoxy group;

$R^2$ is a —$COR^4$ or an —$SO_2CH_3$ group in which $R^4$ is a hydrogen atom; an alkyl group with up to 3 carbon atoms; a phenyl group; a furyl group; or an alkoxy group with up to 4 carbon atoms;

$R_3$ is a hydrogen or chlorine atom or a methyl group; and $n$ is 3, 4 or 5;

and their salts.

Preferred salts are the hydrochlorides.

The invention further provides a number of processes, herein designated (a), (b), (c) etc., for the production of the new aminophenyl-cycloamidines.

Process (a) comprises reacting an aniline derivative of the general formula:

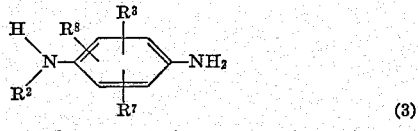

(3)

with a lactam or thiolactam of the general formula

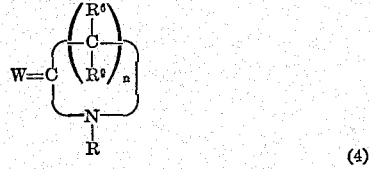

(4)

in which general Formulae W is oxygen or sulphur and R to $R^3$, $R^5$ to $R^9$ and $n$ are as defined above or a salt or a reactive derivative thereof.

The reaction takes place optionally in the presence of a condensation agent, and the product is isolated either in the form of its salt or in the form of the free base. In the latter instance, when a salt is required the base can then be converted into the required salt.

The salts of the lactams and thiolactams (4) that may be used in process (a) include both the salts with organic acids (for example, acetic acid) and the salts with inorganic acids (for example hydrohalides and sulphates).

The reactive lactam and thiolactam derivatives that may be used in process (a) include, for example, compounds obtained by reaction of a lactam or thiolactam of the general Formula 4 with an inorganic acid, for example, hydrochloric acid, boron trichloride or sulphuric acid or with an inorganic or organic acid halide, for example, phosphorus oxychloride, phosphorus pentachloride, phosgene, thionyl chloride, benzoyl bromide, p-toluenesulphonyl chloride or a mixture of phosgene/aluminium chloride or phosgene/hydrogen chloride or phosgene/phosphorus oxychloride or with a trialkyloxonium fluoborate having 1 to 5 carbon atoms per alkyl group, or with a dialkylsulphate having 1 to 5 carbon atoms per alkyl group or an alkyl halide having 1 to 5 carbon atoms.

As reactive lactam and thiolactam derivatives, acetals of the general formula:

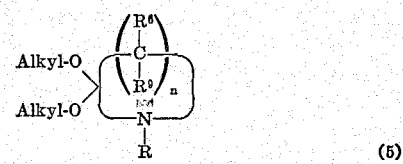

(5)

in which R, $R^6$, $R^9$ and $n$ have the above mentioned meaning and are as defined above and "alkyl" is an alkyl group havin up to four carbon atoms is reacted with the aniline derivative of general Formula 3.

The following are examples of condensation agents which can be employed in process (a):

In organic acids (for example, hydrochloric acid, boron trichloride or sulphuric acid); inorganic or organic acid halides (for example, phosphorus oxychloride, phosphorus pentachloride, phosgene, thionyl chloride, benzoyl bromide, p-toluenesulphonyl chloride or a mixture of phosgene/aluminium chloride or phosgene/hydrogen chloride or phosgene/phosphorus oxychloride); trialkyloxonium fluoborates (1 to 5 carbon atoms per alkyl group); dialkyl sulphates (1 to 5 carbon atoms per alkyl group); and alkyl halides (1 to 5 carbon atoms).

When a thiolactam (general Formula 4, W=sulphur) is used, a desulphurising agent, for example, HgO, $Ag_2O$ and $Hg(CN)_2$ can be used advantageously in addition to the condensation agent, or without the condensation agent.

The reactants are preferably employed in the stoichiometrically required amounts.

It is possible to use any inert organic solvents; suitable solvents are for example aromatic, optionally halogenated hydrocarbons, for example, benzene, toluene and dichlorobenzene; optionally chlorinated aliphatic hydrocarbons, for example, methylene chloride and chloroform; tetramethylene-sulphone; lower aliphatic alcohols, example, methanol and ethanol.

The reactants are preferably brought together at room temperature (about 20° C.) and are warmed, if necessary, to between 30 and 150° C., preferably 70 to 120° C., in order to complete the reaction.

The success of the reaction does not depend on the sequence in which the reactants are brought together.

The new compounds are isolated in the customary manner.

Process (b) comprises reacting an imide-chloride of the general formula:

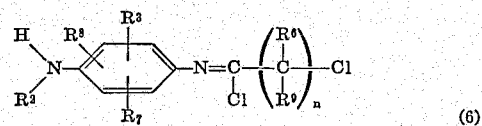

(6)

with an amine of the general formula $$R—NH_2 \qquad (7)$$

in which general Formula, R to $R^3$, $R^6$ to $R^9$ and $n$ are as defined above.

Processes are known by which the imide-chloride can be obtained, for example, the reaction of the aniline derivative of general Formula 3 with an ω-halogeno-alkanoic acid chloride and subsequent reaction with a phosphorus halide.

In process (b), the reactants are preferably employed in approximately molar amounts. The reaction is expediently carried out at 20 to 150° C., preferably at 80 to 120° C., optionally in the presence of an inert organic solvent. As solvent there may for example be used aromatic hydrocarbons or chlorinated hydrocarbons, such as benzene, toluene and dichlorobenzene.

Process (c) comprises reacting an arylisocyanate of the general Formula:

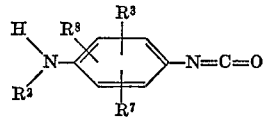

(8)

with a lactam of the general Formula:

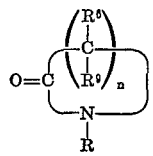

(9)

in which R to $R^3$, $R^6$, to $R^9$ and $n$ are as defined above.

The process of the reaction may be followed by the evolution of carbon dioxide.

In process (c), the reactants are generally employed in approximately molar amounts. If the reaction is carried out without the addition of a solvent, one of the reactants, used in excess, can serve as the solvent. The reactants are expediently heated to 100 to 200° C., preferably 150 to 180° C. The reaction can be carried out in the presence of a solvent; any high-boiling inert organic solvent, for example, toluene and xylenes, can be used.

Process (d) comprises reacting a carbamic acid chloride of the general formula:

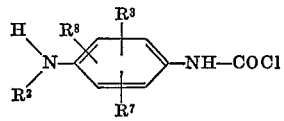

(10)

with a lactam of the general formula

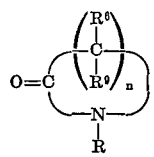

(11)

in which general Formula, R to $R^3$, $R^6$ to $R^9$ and $n$ are as defined above.

The recommended reaction conditions (molar ratio, temperature and solvent) for process (d) are the same as for process (c).

Process (e) is applicable to those compounds or salts of the invention in which R is not a hydrogen atom, and comprises reacting a cyclic amidine of the general Formula:

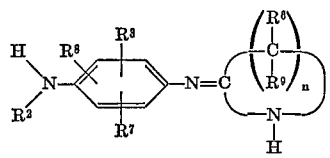

(11)

with an alkylating agent of the general formula $$B—R \qquad (12)$$

in which general Formulae B is a reactive ester group or a halogen atom, R is as defined above (but is not hydrogen) and $R^2$, $R^3$, $R^6$ to $R^9$ and $n$ are as defined above. B can for example be an arylsulphonyloxy group as for example benzenesulphonyloxy or tosyloxy or an alkylsulphonyloxy group as for example methanesulphonyloxy.

In process (e) the reactants are preferably employed in molar amounts.

The reaction is expediently carried out at a temperature between 0 and 120° C., preferably at 20 to 80° C., preferably in the presence of an inert organic solvent. An ether as for example, diethyl ether or tetrahydrofurane or an alkylnitrile, as for example, acetonitrile may be used as the solvent. At times it may also be desirable to add an acid-binding agent, such as for example, an alkali metal carbonate or an alkaline earth metal carbonate, preferably sodium or potassium carbonate.

Process (f) comprises reacting an aminophenylamidine of the general formula:

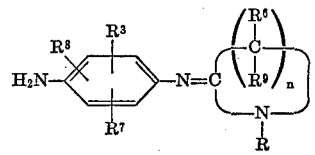

(13)

with an acylating or sulphonylating agent of the general formula:

$$Y—Z \qquad (14)$$

in which Z is as defined above for $R^2$, Y is a reactive acid group, and R to $R^3$, $R^6$ to $R^9$ and $n$ are as defined above.

The reaction can be carried out in the presence of a solvent and optionally also in the presence of an acid-binding agent.

Y can be, for example, a chlorine, bromine or iodine atom. Where Z is the —$COR^4$ group, Y represents the group —O—CO—$R^{4\prime\prime\prime}$ or —$COR^{4\prime\prime\prime}$ in which $R^{4\prime\prime}$ and $R^{4\prime\prime\prime}$ have the meanings given above for $R^4$ and can be the same as or different from $R^4$.

If Z is the —$SO_2R^5$ group, Y is a halogen atom.

As the acylating or sulphonylating agent Y—Z, there may especially be mentioned: lower alkylpyrocarbonic acid esters with 1 to 4 carbon atoms in the alkyl part; lower chloroformic acid alkyl esters with, preferably, 1 to 4 carbon atoms in the alkyl component; lower alkylcarboxylic acid chlorides and bromides with, preferably, 1 to 4 carbon atoms in the alkyl group; formic acid alkyl esters with 1 to 4 carbon atoms in the ester part; methanesulphonic acid chloride; benzoyl chloride and acetic anhydride.

In process (f), the reactants are preferably brought together in molar amounts.

The reaction temperatures are expediently 0 to 120° C., preferably 20 to 90° C.

As solvents, it is possible to employ any organic solvent which is inert during this reaction. As examples of such solvents, there may be mentioned lower aliphatic alcohols, as for example, methanol or ethanol aromatic hydrocarbons as for example, benzene or toluene; petroleum ether; chlorinated hydrocarbons as for example, chloroform and methylene chloride, and tetramethylenesulphone.

The starting materials to be employed in the processes according to the invention are known or are obtainable according to known methods.

The following may, for example, be mentioned as starting materials for the production of the aminophenylcycloamidines and salts according to the invention:

4-carbethoxy-amino-aniline,
  -carbomethoxyamino-aniline,
  -carbisopropoxy-amino-aniline,
  -carbutoxyamino-aniline,
  -methylsulphonylamino-aniline,
  -ethylsulphonylamino-aniline,
  -acetamino-aniline,
  -propionylamino-aniline,
  -butyrylamino-aniline,
  -isovaleroylamino-aniline,
  -acryloyl-amino-aniline,
  -methoxypropionyl-aniline,
  -carballyloxyamino-aniline;

2-(4-nitrophenylimino)pyrrolidine;
2-(4-nitrophenylimino)-1-methyl-pyrrolidine;
2-(nitrophenylimino)-1-methyl-piperidine;
2-(nitrophenylimino)-1-methyl-1-azacycloheptane;
4-carbethoxyamino-3-chloro-aniline;
4-carbalkoxyamino-2-chloro-aniline;
4-carbethoxyamino-3-chloro-5-methyl-aniline;
4-carbethoxyamino-3,5-dimethyl-aniline;
4-(N-carbethoxy-N-methylamino)-aniline;
4-carbethoxyamino-3-bromo-aniline; and
4-carbethoxyamino-trifluoromethyl-aniline.

The processes according to the invention for the production of the new aminophenyl-amidines and salts of the invention are illustrated in the following examples.

All temperatures are given in degrees centrigrade (° C).

EXAMPLE 1

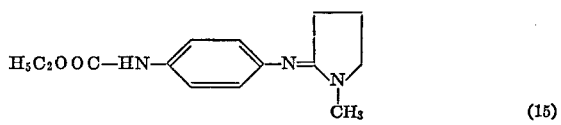

(15)

37.5 g. (0.21 mol) of phosphorus oxychloride are added dropwise, at 10–20°, to 41.8 g. (0.42 mol) of N-methyl-pyrrolidone, dissolved in 200 ml. of benzene; the mixture is stirred for 5 hours at 20°, 37.8 g. (0.21 mol) of 4-carbethoxyamino-aniline are then added at 20°, and the whole is heated overnight to 60–70°. The benzene solution is decanted off and the residue is treated with water and sodium hydroxide solution, whilst cooling. After extraction with chloroform, the solvent is evaporated off, and the crystalline residue is recrystallised from ethyl acetate.

Yield: 25.7 g. of 2-(4-carbethoxyaminophenyl-imino)-1-methylpyrrolidine; melting point: 106–107°.

The same compound is also obtained by heating equimolar amounts of N-methylpyrrolidone, phosphorus oxychloride or phosgene and 4-carbethoxyamino-aniline in toluene for 4 hours.

The subsequent working up is carried out correspondingly. On addition of hydrochloric acid in ether, the hydrochloride, melting point 205–207° (decomposition), is obtained.

The following are obtained by an analogous procedure:

2-(4-carboisobutoxyaminophenyl-imino)-1-methyl-pyrrolidine hydrochloride;
2-(4-carballyloxyaminophenyl-imino)-1-methyl-pyrrolidine hydrochloride;
2-(4-carbocrotyloxyaminophenyl-imino)-1-methyl-pyrrolidine hydrochloride;
2-(4-carbomethallyloxy aminophenyl-imino)-1-methyl-pyrrolidine hydrochloride;
2-(4-carbopropinyloxyaminophenyl-imino)-1-methyl-pyrrolidine hydrochloride;
2-[4-carbo($\beta$-methoxyethyloxy)-aminophenyl-imino]-1-methyl-pyrrolidine hydrochloride;
2-(4-carbocyclopropyloxyaminophenyl-amino)-1-methyl-pyrrolidine hydrochloride;
2-(4-carbocyclobutyloxyaminophenyl-imino)-1-methyl-pyrrolidine hydrochloride;
2-(4-carbocyclopentyloxyaminophenyl-imino)-1-methyl-pyrrolidine hydrochloride;
2-(4-carbocyclohexyloxy-aminophenyl-imino)-1-methyl-pyrrolidine hydrochloride;
2-(4-carbocyclohexylmethyloxyaminophenyl-imino)-1-methyl-pyrrolidine hydrochloride;
2-(4-carbobenzoxyaminophenyl-imino)-1-methyl-pyrrolidine hydrochloride;
2-(4-carbophenethyloxyaminophenyl-imino)-1-methyl-pyrrolidine hydrochloride;
2-(4-carbotetrahydrofuryloxyaminophenyl-imino)-1-methyl-pyrrolidine hydrochloride; and
2-(4-carbotetrahydrofurfuryloxy-aminophenyl-imino)-1-methyl-pyrrolidine hydrochloride.

EXAMPLE 2

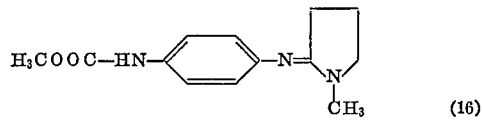

(16)

22 g. of 2-(4-nitrophenylimino)-1-methyl-pyrrolidine, dissolved in 200 ml. of ethanol, are catalytically hydrogenated with Raney nickel, at 70–80°, until 2 mols of hydrogen have been taken up. After evaporating off the solvent, 15 g. of 2-(4-aminophenyl-imino)-1-methyl-pyrrolidine, boiling point 170–175°, melting point 85–86°, are obtained.

The same compound can also be produced in a similar way by hydrogenation of 2-(4-nitrophenyl-imino)-1-methyl-pyrrolidine hydrochloride in ethanol with Raney nickel. After evaporation, the hydrochloride of 2-(4-aminophenyl - imino) - 1-methyl-pyrrolidine is obtained, and this is converted into the free base by means of sodium hydroxide solution.

12.5 g. (0.11 mol) of pyrocarbonic acid methyl ester are added dropwise to 18.9 g. (0.1 mol) of 2-(4-aminophenylimino)-1-methyl-pyrrolidine dissolved in 200 ml. of ethanol, and the mixture is stirred for one hour at 20° and then heated for 5 minutes to 80°. After evaporation, and recrystallisation from ethyl acetate, 21.4 g. of 2-(4-carbomethoxyaminophenylimino) - 1 - methyl-pyrrolidine, melting point 149–151°, are obtained.

EXAMPLE 3

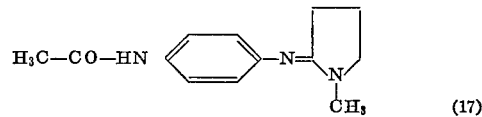

(17)

7.3 g. (0.093 mol) of acetyl chloride are added dropwise at 10–20°, to 14 g. (0.074 mole) of 2-(4-aminophenylimino)-1-methyl-pyrrolidine dissolved in 200 ml. of toluene, the mixture is stirred for a further hour, and the 2 - ( 4 - acetaminophenyl-imino)-1-methyl-pyrrolidine hydrochloride which has precipitated is filtered off and recrystallised from ethanol/ethyl acetate.

Melting point: 208–209°, yield: 14.3 g. Free base, melting point: 197–197.5°.

The following are obtained in an analogous manner:

2-(4-butyrylaminophenyl-imino)-1-methyl-pyrrolidine;
2-(4-pivaloylaimnophenyl-amino)-1-methyl-pyrrolidine;
2-(4-valeroylaminophenyl-imino)-1-methyl-pyrrolidine;
2-(4-acryloylaminophenyl-amino)-1-methyl-pyrrolidine;
2-(4-methacryloylaminophenyl-imino)-1-methyl-pyrrolidine;
2-(4-crotonylaminophenyl-imino)-1-methyl-pyrrolidine;
2-(4-propinylcarbonylaminophenyl-imino)-1-methyl-pyrrolidine;
2-(4-methoxyacetylaminophenyl-amino)-1-methyl-pyrrolidine;
2-(4-cyclopropylcarbonylamino-phenyl-imino)-1-methyl-pyrrolidine;
2-(4-cyclobutylcarbonylaminophenyl-imino)-1-methyl-pyrrolidine;
2-(4-cyclopentyl-carbonylaminophenyl-imino)-1-methyl-pyrrolidine;
2-(4-cyclohexylcarbonylaminophenyl-imino)-1-methyl-pyrrolidine;
2-(4-methylcyclopentylcarbonylaminophenyl-imino)-1-methyl-pyrrolidine;
2-(4-methylcyclohexylcarbonylaminophenyl-imino)-1-methyl-pyrrolidine;
2-(4-cyclopentenylcarbonylaminophenyl-imino)-1-methyl-pyrrolidine;
2-(4-cyclohexenylcarbonylamino-phenyl-imino)-1-methyl-pyrrolidine;

2-(4-phenacetylaminophenyl-imino)-1-methyl-pyrrolidine;
2-(4-phenethylcarbonylaminophenyl-imino)-1-methyl-pyrrolidine;
2-[4-tetrahydrofurylcarbonyl-(2)-imino]-1-methyl-pyrrolidine;
2-[4-(5-methyl-tetrahydrofuryl-carbonyl-(2)-imino]-1-methyl-pyrrolidine;
2-[4-(2-methyl-tetrahydrofurylcarbonyl-(2)-aminophenyl-imino]-1-methyl-pyrrolidine;
2-[4-tetrahydrofurfurylcarbonyl-(2)-aminophenyl-imino]-1-methyl-pyrrolidine;
2-(4-tetrahydropyranylcarbonyl-aminophenyl-imino)-1-methyl-pyrrolidine;
2-(4-trifluoromethyl-carbonylaminophenyl-imino)-1-methyl-pyrrolidine;
2-(4-trichloromethylcarbonylaminophenyl-imino)-1-methyl-pyrrolidine;
2-(4-carbethoxymethylenecarbonylaminophenyl-imino)-1-methyl-pyrrolidine;
2-(4-cyclopropylsulphonylaminophenyl-imino)-1-methyl-pyrrolidine;
2-(4-cyclobutylsulphonylaminophenyl-imino)-1-methyl-pyrrolidine;
2-(4-cyclopentylsulphonylamino-phenyl-imino)-1-methyl-pyrrolidine;
2-(4-cyclohexylsulphonylaminophenyl-imino)-1-methyl-pyrrolidine; and
2-(4-cycloheptylsulphonylaminophenyl-imino)-1-methyl-pyrrolidine.

EXAMPLE 4

The following compounds are obtained in accordance with the methods described in Examples 1–3:

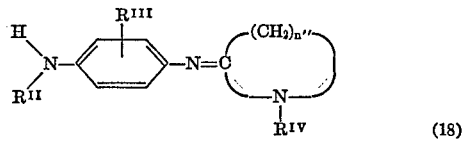

(18)

| $HR^{II}N-$ | $R^{III}$ | $R^{IV}$ | $n'$ | Constants—Melting point or boiling point/mm. Hg., or analysis | Manufacture according to Example— |
|---|---|---|---|---|---|
| 4-$H_5C_2OOC$-NH | H | $C_2H_5$ | 3 | 170°/0.2 | 1 |
| 4-$(CH_3)_2HC$-OOC-NH | H | $CH_3$ | 3 | Oil | 2 |
| 4-$C_3H_7OOC$-HN | H | $CH_3$ | 3 | 95–96° | 2 |
| 4-$C_4H_9OOC$-NH | H | $CH_3$ | 3 | 117–118° | 2 |
| 4-$H_5C_2OOC$-HN | H | $C_4H_9$ | 3 | 63–64.5° | 1 |
| 4-$H_5C_2OOC$-HN | H | $CH_2$—CH=$CH_2$ | 3 | 160–170°/0.001 | 1 |
| 4-$H_5C_2OOC$-HN | H | $CH_2$—CH=CH—$CH_3$ | 3 | 160–170°/0.001 | 1 |
| 4-$H_5COOC$-HN | H | H | 3 | 186° (decomposition) | 1 |
| 4-$H_5C_2OOC$-HN | H | H | 3 | 158° | 1 |
| 4-$H_5C_2OOC$-HN | 3-$CH_3$ | $CH_3$ | 3 | 125–127° | 2 |
| 4-$H_9C_4OOC$-HN | 3-$CH_3$ | $CH_3$ | 3 | Oil; Calculated.—C=67.3; H=8.3; Found.—C=67.1; H=8.5 | 2 |
| 4-$H_5C_2OOC$—HN | 3-$CH_3$ | $C_4H_9$ | 3 | Oil; Calculated.—C=68.1; H=8.6; Found.—C=67.8; H=8.4 | 2 |
| 4-$CH_3$—CO—HN | 3-$CH_3$ | $CH_3$ | 3 | Hydrochloride. Melting point 230–231° | 3 |
| 4-$H_7C_3$—CO—HN | 3-$CH_3$ | $CH_3$ | 3 | Hydrochloride. Melting point 215–217° | 3 |
| 4-$H_5C_2OOC$-HN | 2-$CH_3$ | H | 3 | Oil; Calculated.—C=66.29; H=7.22; Found.—C=66.11; H=7.33$ | 2 |
| 4-$H_5C_2OOC$—HN | 3-Cl | $C_3H_7$ | 3 | Hydrochloride. Melting point 213° (decomposition) | 1 |
| 4-$H_5C_2OOC$-HN | 3-Cl | $CH_2$—CH=CHCl | 3 | 170°/0.001 | 1 |
| 4-$H_5C_2OOC$-HN | 3-Cl | $CH(CH_3)_2$ | 3 | 91–92° | 1 |
| 4-$H_5C_2OOC$-HN | 3-Cl | $CH_2$—$CH_2$—$CH_2$—$OCH_3$ | 3 | 160–165°/0.001 | 1 |
| 4-$H_5C_2OOC$-HN | 3-Cl | $CH_3$ | 3 | 87° | 1 |
| 4-$C_3H_7$—CO—HN | 2-Cl | $CH_3$ | 3 | 189–191° | 3 |
| 4-$CH_3$—CO—HN | 2-Cl | $CH_3$ | 3 | Hydrochloride. Melting point 220–224° | 3 |
| 4-$(CH_3)_2CH$—CO—HN | 2-Cl | $CH_3$ | 3 | 123–125° | 3 |
| 4-$C_2H_5OOC$—HN | 2-Cl | $CH_3$ | 3 | Oil | 2 |
| 4-$CH_3OOC$—HN | 2-Cl | $CH_3$ | 3 | 165–168° | 2 |
| 4-$CH_3$—$SO_2$—HN | 2-Cl | $CH_3$ | 3 | Hydrochloride. Melting point 222–226° | 3 |
| 4-$H_5C_2OOC$—HN | H | $CH_3$ | 4 | 149–150° | 1 |
| 4-$H_5C_2OOC$—HN | H | $CH_3$ | 5 | 127–128° | 1 |
| 4-$H_5C_2OOC$—HN | H | $CH_2$—$CH_2OH$ | 3 | 157–158° | 1 |
| 4-H·CO—HN | H | $CH_3$ | 3 | 180–185°/0.2 | 1 |
| 4-$H_5C_2OOC$—HN | H | CH=$C(CH_3)_2$ | 3 | 122–125° | 1 |

2-(4-cyanomethylenecarbonylaminophenyl-imino)-1-methyl-pyrrolidine;
2-(4-ethylsulphonylaminophenyl-imino)-1-methyl-pyrrolidine;
2-(4-propylsulphonylaminophenyl-imino)-1-methyl-pyrrolidine;
2-(4-isopropylsulphonylaminophenyl-imino)-1-methyl-pyrrolidine;
2-(4-butylsulphonylaminophenyl-imino)-1-methyl-pyrrolidine;
2-(4-isobutylsulphonylaminophenyl-imino)-1-methyl-pyrrolidine;
2-(4-hexylsulphonylaminophenyl-imino)-1-methyl-pyrrolidine;
2-(4-allylsulphonylaminophenyl-imino)-1-methyl-pyrrolidine;
2-(4-methallylsulphonylaminophenyl-imino)-1-methyl-pyrrolidine;
2-(4-crotonylsulphonylaminophenyl-imino)-1-methyl-pyrrolidine;

EXAMPLE 5

A solution of 29 g. of N-methylthiopyrrolidone and 50 g. of 4-carbethoxyamino-aniline in 400 ml. of ethanol, with 75 g. of mercury oxide added, is vigorously stirred for 8 hours at 0° and then for 15 hours at 80°. The precipitate is filtered off, the filtrate is evaporated in vacuo, and the residue is stirred with ethyl acetate. The crystals which separate out overnight are filtered off and recrystallised from a mixture of ethyl acetate/petroleum ether. 11.3 g. of 2-(4-carbethoxyaminophenyl-imino)-1-methyl-pyrrolidine, melting point 106–107°, are obtained.

EXAMPLE 6

18 g. of 4-carbethoxyamino-aniline and 18.5 g. of 1-methyl-2,2-diethoxy-pyrrolidine are heated to 110–140°, in the course of which the alcohol liberated during the reaction distills off over the course of about 30 minutes. The residue, after recrystallisation from ethyl acetate/petroleum ether, yields 12.8 g. of 2-(4-carbethoxyaminophenyl-imino)-1-methyl-pyrrolidine, melting point 106–107°.

EXAMPLE 7

15.8 g. of methyl iodide are added dropwise, at 20°, to 24.7 g. (0.1 mol) of 2-(4-carbethoxyaminophenyl-imino)-pyrrolidine dissolved in 250 ml. of tetrahydrofurane, and the mixture is subsequently heated overnight under reflux and evaporated in vacuo. The residue is taken up in a mixture of chloroform/ether and extracted several times with water, and the organic phase is evaporated; after recrystallisation from ethyl acetate/petroleum ether, 5.8 g. of 2-(4-carbethoxyaminophenyl-imino)-1-methyl-pyrrolidine, melting point 106–107°, are obtained.

EXAMPLE 8

A mixture of 24.3 g. of butyrolactim-S-methyl-ether hydriodide, 18 g. of 4-carbethoxyamino-aniline, 100 ml. of ethanol and 5 ml. of water is heated for 15 hours under reflux. The reaction mixture is evaporated in vacuo, the residue is rendered alkaline with sodium hydroxide solution, and after working up in accordance with Example 1, 13.7 g. of 2-(4-carbethoxyaminophenyl-imino)-pyrrolidine, melting point 158°, are obtained.

EXAMPLE 9

31.4 g. of 4-chlorobutyric acid chloride are added to a solution of 36 g. of 4-carbethoxyamino-aniline in 350 ml. of toluene, the mixture is heated for 2 hours under reflux and cooled, 48.7 g. of phosphorus pentachloride are added and the whole is gradually heated to 100°. After completion of the splitting off of HCl, the phosphorus oxychloride formed is distilled off in vacuo, the residue is taken up in 200 ml. of toluene, and this solution is added dropwise to 35 g. of N-methylbutylamine in 200 ml. of benzene and heated for 2 hours under reflux. The whole is poured onto ice water, rendered alkaline with sodium hydroxide, and worked up analogously to Example 1. Yield, 17 g. of 2-(4-carbethoxyaminophenyl-imino)-1-methyl-pyrrolidine, melting point 106–107°.

EXAMPLE 10

50 ml. of N-methylpyrrolidone and 20 g. of 4-carbethoxyaminophenyl isocyanate are heated under reflux until the evolution of $CO_2$ has ended. Low-boiling constituents are distilled off, and after recrystallising the residue, 9.3 g. of 2-(4-carbethoxyaminophenyl-imino)-1-methyl-pyrrolidine, melting point 106–107°, are obtained.

EXAMPLE 11

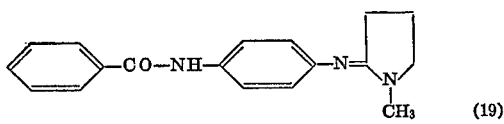

(19)

14.05 g. of benzoyl chloride are added dropwise, at 20°, to 18.9 g. of 2-(4-aminophenyl-imino) - 1 - methyl-pyrrolidine, dissolved in 150 ml. of ethanol, and the whole is heated for one hour under reflux. After cooling, the 2-(4-benzoyl-aminophenyl-imino) - 1 - methyl - pyrrolidine hydrochloride which has separated out is filtered off; it is obtained in an amount of 23.7 g. in the pure form, melting point 252–253° (decomposition). The free base is obtained therefrom by adding sodium hydroxide solution.

The following compounds are obtained by analogous processes:

2-[4-(4-chlorobenzoylaminophenyl-imino]-1-methyl-pyrrolidine;
2-[4-(3-chlorobenzoylaminophenyl-imino]-1-methyl-pyrrolidine;
2-[4-(2-chlorobenzoylaminophenyl-imino]-1-methyl-pyrrolidine;
2-[4-(4-methylbenzoylaminophenyl-imino]-1-methyl-pyrrolidine;
2-[4-(3-methylbenzoylaminophenyl-imino]-1-methyl-pyrrolidine;
2-[4-(2-methylbenzoylaminophenyl-imino]-1-methyl-pyrrolidine;
2-[4-(2,6-dichlorobenzoylaminophenyl-imino]-1-methyl-pyrrolidine;
2-[4-(4-nitrobenzoylaminophenyl-imino]-1-methyl-pyrrolidine;
2-[4-(4-nitro-2-chlorobenzoylaminophenyl-imino]-1-methyl-pyrrolidine;
2-[4-(4-bromobenzoylaminophenyl-imino]-1-methyl-pyrrolidine;
2-[4-(2,4-dichlorobenzoylaminophenyl-imino]-1-methyl-pyrrolidine;
2-[4-(2,3-dichlorobenzoylaminophenyl-imino]-1-methyl-pyrrolidine;
2-[4-(3,4-dichlorobenzoylaminophenyl-imino]-1-methyl-pyrrolidine;
2-[4-(2,3,6-trichlorobenzoylaminophenyl-imino]-1-methyl-pyrrolidine;
2-[4-(4-fluorobenzoylaminophenyl-imino]-1-methyl-pyrrolidine;
2-[4-(3-trifluoromethylbenzoylaminophenyl-imino]-1-methyl-pyrrolidine;
2-[4-(3-chloro-6-acetyloxybenzoylamino)-phenyl-imino]-1-methyl-pyrrolidine;
2-[4-(4-methoxybenzoylamino)-phenyl-imino]-1-methyl-pyrrolidine;
2-[4-(3-methoxybenzoylamino)-phenyl-imino]-1-methyl-pyrrolidine;
2-[4-(2-methoxybenzoylamino)-phenyl-imino]-1-methyl-pyrrolidine;
2-[4-(3-chloro-6-methoxybenzoylamino)-phenyl-imino]-1-methyl-pyrrolidine;
2-[4-(2-chloro-4-methoxybenzoylamino)-phenyl-imino]-1-methyl-pyrrolidine;
2-[4-(2,3-dimethoxybenzoylamino)-phenyl-imino]-1-methyl-pyrrolidine;
2-[4-(3-carbethoxyamino-4-methoxybenzoylamino)-phenyl-imino]-1-methyl-pyrrolidine;
2-[4-(4-acetylaminobenzoylamino)-phenyl-imino]-1-methyl-pyrrolidine;
2-[4-(3-butoxyaminobenzoylamino)-phenyl-imino]-1-pyrrolidine;
2-[4-(4-ethoxyaminobenzoylamino)-phenyl-imino]-1-methyl-pyrrolidine;
2-[4-(3,4,5-trimethoxyaminobenzoylamino)-phenyl-imino]-1-methyl pyrrolidine;
2-[4-(4-methylsulphonylaminobenzoylamino)-phenyl-imino]-1-methyl-pyrrolidine;
2-[4-(2-methylsulphonylbenzoylamino)-phenyl-imino]-1-methyl-pyrrolidine;
2-[4-(3,4-dimethylsulphonylbenzoylamino)-phenyl-imino]-1-methyl-pyrrolidine;
2-[4-(2-methylsulphonylaminobenzoylamino)-phenyl-imino]-1-methylpyrrolidine;
2-(4-phenoxyacetylaminophenyl-imino)-1-methyl-pyrrolidine, HCl salt, melting point 237–240° (decomposition);
2-[4-(2-phenoxypropionylamino)-phenyl-imino]-1-methyl-pyrrolidine;
2-[4-(2-phenoxybutyrylamino)-phenyl-imino]-1-methyl-pyrrolidine;
2-[4-(2-methylphenoxyacetylamino)-phenyl-imino]-1-methyl-pyrrolidine;
2-[4-(2-methoxyphenoxyacetylamine)-phenyl-imino]-1-methyl-pyrrolidine;
2-[4-(2-methoxyphenoxyacetylamino)-phenyl-imino]-1-methyl-pyrrolidine;
2-[4-(2-isopropylphenoxyacetylamino)-phenyl-imino]-1-methyl-pyrrolidine;
2-[4-(3,4-dimethylphenoxyacetylamino)-phenyl-imino]-1-methyl-pyrrolidine;
2-[4-(3,5-dimethoxyphenoxyacetylamino)-phenyl-imino]-1-methyl-pyrrolidine;

2-[4-(2-chlorophenoxyacetylamino)-phenyl-imino]-1-methyl-pyrrolidine;
2-[4,(2-methyl-4-chlorophenoxyacetylamino)-phenyl-imino]-1-methyl-pyrrolidine;
2-[4-(2,4-dichlorophenoxyacetylamino)-phenyl-imino]-1-methyl-pyrrolidine;
2-[4-(2,5-dichlorophenoxyacetylamino)-phenyl-imino]-1-methyl-pyrrolidine;
2-[4-(4-nitrophenoxyacetylamino)-phenyl-imino]-1-methyl-pyrrolidine;
2-(cinnamoylaminophenyl-imino)-1-methyl-pyrrolidine;
2-[4-(2,6-dichlorocinnamoylamino)-phenyl-imino]-1-methyl-pyrrolidine;
2-[4-(1-naphthoylamino)-phenyl-imino]-1-methyl-pyrrolidine;
2-[4-(2-naphthoylamino)-phenyl-imino]-1-methyl-pyrrolidine;
2-[4-(2-indenylcarbonylamino)-phenyl-imino]-1-methyl-pyrrolidine;
2-[4-(1-tetralylcarbonylamino)-phenyl-imino]-1-methyl-pyrrolidine;
2-[4-(2-tetralylcarbonylamino)-phenyl-imino]-1-methyl-pyrrolidine;
2-[4-(5-tetralylcarbonylamino)-phenyl-imino]-i-methyl-pyrrolidine;
2-(4-benzoylaminophenyl-imino)-1-methyl-piperidine; and
2-(4-benzoylaminophenyl-imino)-1-methyl-hexahydro-azepine.

EXAMPLE 12

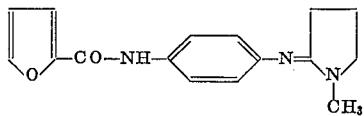

(20)

Following the procedure described in Example 11, 18.9 g. of 2-(4-aminophenyl-imino)-1-methyl-pyrrolidine and 15.7 g. of 2-furanecarboxylic acid chloride in ethanol yield 23.4 g. of 2-[4-(2 - furylcarbonyl) - aminophenyl-imino]-1-methyl-pyrrolidine hydrochloride. The free base is obtained therefrom by adding sodium hdyroxide solution.

The following are obtained by an analogous method:

2-[4-(5-methyl-isoxazolylcarbonyl-(3)-aminophenyl-imino]-1-methyl-pyrrolidine;
2-[4-(2-pyridylcarbonyl)-aminophenyl-imino]-1-methyl-pyrrolidine;
2-[4-(3-pyridylcarbonyl)-aminophenyl-imino]-1-methyl-pyrrolidine;
2-[4-(4-pyridylcarbonyl)-aminophenyl-imino]-1-methyl-pyrrolidine;
2-[4-(2-thienylcarbonyl)-aminophenyl-imino]-1-methyl-pyrrolidine;
2-[4-(2-furfurylcarbonyl)-aminophenyl-imino]-1-methyl-pyrrolidine;
2-[4-(2-indolylcarbonyl)-aminophenyl-imino]-1-methyl-pyrrolidine;
2-[4-(2-thianaphthylcarbonyl)-aminophenyl-imino]-1-methyl-pyrrolidine;
2-[4-(3-indolylacetyl)-aminophenyl-imino]-1-methyl-pyrrolidine;
2-[4-(3-quinolylcarbonyl)-aminophenyl-imino]-1-methyl-pyrrolidine;
2-[4-(2-phenothiazinylcarbonyl)-aminophenyl-imino]-1-methyl-pyrrolidine;
2-[4-(2-thienylacetyl)-aminophenyl-imino]-1-methyl-pyrrolidine;
2-[4-(3-pyrazolylcarbonyl)-amino-phenyl-imino]-1-methyl-pyrrolidine;
2-[4-(4-methyl-3-pyrazolylcarbonyl)-aminophenyl-imino]-1-methyl-pyrrolidine;
2-[4-(2-imidazolylcarbonyl)-aminophenyl-imino]-1-methyl-pyrrolidine;
2-[4-pyrazinylcarbonylaminophenyl-imino]-1-methyl-pyrrolidine;
2-[4-(4-pyrimidinylcarbonyl)-aminophenyl-imino]-1-methyl-pyrrolidine; and
2-[4-(5-thiazolylcarbonyl)-aminophenyl-imino]-1-methyl-pyrrolidine.

As already mentioned, the new aminophenylcycloamidines and salts show very good activity against helminths, and additionally show hypotensive properties. When the new active compounds are used as anthelmintics the hypotensive effect does not prove disadvantageous, since it is negligibly small after what is in most cases only a single administration of the compound. It is surprising and unforeseeable that a high anthelmintic activity should arise in the compounds according to the invention through the introduction of an acylamino or of a sulphonylamino group into the phenyl nucleus of the phenylcycloamidines. The new compounds have a significantly better effect than other known anthelmintics having the same type of action, for example, bephenium hydroxynaphthoates, phenylene - 1,4 - diisothiocyanate, perchloroethylene, thiabendazole and parbendazole. Additionally, a good hypotensive action was, surprisingly, found in some of the compounds according to the invention (active dosage when administered orally to hypertensive rats, about 0.5 to about 5.0 mg./kg.). Undesired side-effects, such as damping of the central nervous system, do not occur even at a dosage which is ten times more powerful than that used therapeutically. The new compounds are therefore also valuable for the treatment of high blood pressure.

The provision by the invention of these new aminophenylamidines and salts therefore constitutes a significant extension of the available range of medicines.

In particular, the compounds prepared according to the invention for example show a surprisingly good and broad action against the following helminths (nematodes and cestodes):

(I) NEMATODES (1) *Ancylostoma caninum, Uncinaria stenocephala* and *Bunostomum trigonocephalum* (hookworms) from the family of the Ancylostomatidae;

(2) *Haemonchus contortus, Trichostrongylus colubriformis, Cooperia punctata, Ostertagia circumcincta, Nippostrongylus muris* and Nematospiroides dubius (worms of the stomach and small intestine) from the family of the Trichostrongylidae;

(3) *Oesophagostomum columbianum* and *Chabertia ovina* (worms of the large intestine) from the family of the Strongylidae;

(4) *Strongyloides ratti* (dwarf threadworms) from the family of the Rhabditidae;

(5) *Toxocara canis, Toxascaris leonina* and *Ascaris suum* larvae (coilworms) from the family of the Ascarididae;

(6) *Aspiculuris tetraptera* (maggot worms) from the family of the Oxyuridae;

(7) *Heterakis spumosa* from the family of the Heterakidae.

(II) CESTODES (1) *Hymenolepis nana* and *Hymenolepis microstoma* (tapeworms) from the super-family of the Taenioidea.

The action was examined in animal experiments, after oral and parenteral administration to test animals severely infected with parasites. The dosages used were tolerated very well by the test animals.

The unexpected superiority of the new compounds over previously known compounds of the same indication, as well as their excellent action, is shown in examples of Tests A-C (Tables 1–3).

It should be emphasised particularly that the excellent test results were achieved with a single administration.

EXAMPLE A

Hookworm test/dog

Dogs experimentally infected with *Ancylostoma caninum* were treated after the end of the pre-patent period of the parasites.

The amount of active compound was administered orally as pure active compound or as a 10% strength solution in lactic acid, in gelatine capsules.

The degree of action was determined by counting the worms expelled after the treatment and the worms remaining in the test animal, after dissection, and calculating the percentage of the worms expelled.

The active compounds tested, dosages used and action are summarized in Table 1 below:

TABLE 1
Hookworm Test/Dog

| Active compound | | Dosage. mg./kg. | Action in percent |
|---|---|---|---|
| Known compounds for comparison: | | | |
| 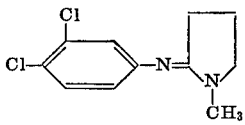 | (20) | 25 | 0 |
| 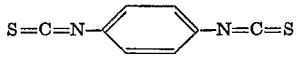 | (21) | 50 | 51 |
| $Cl-C=C-Cl$ <br> $\phantom{Cl-}|\phantom{C=}|$ <br> $\phantom{Cl-}Cl\phantom{=}Cl$ | (22) | 300 | 82 |
| 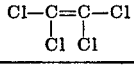 | (a) | 60 | 46 |
| 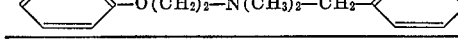 | (23) | 100 | 65 |
| 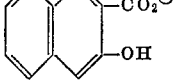 | (24) | 100 | 0 |
| 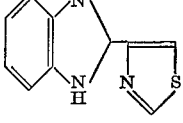 | (b) (25) | 100 200 | 77 93 |
| Compounds according to the invention: | | | |
| 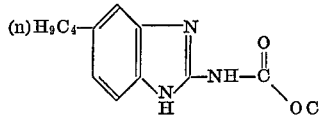 | (15) | 10 25 50 | 66 98 99 |
| 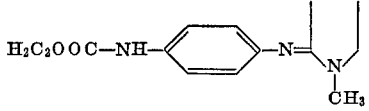 | (26) | 5 10 25 | 53 87 98 |
| 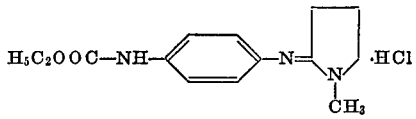 | (27) | 25 | 100 |
| Compounds according to the invention: | | | |
| 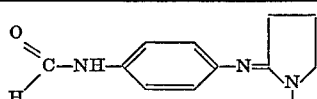 | (17) | 50 | 100 |
| 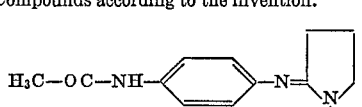 | (28) | 25 | 67 |

See footnotes at end of table.

TABLE 1—Continued

| Active compound | | Dosage. mg./kg. | Action in percent |
|---|---|---|---|
| $CH_3-SO_2-NH-\langle$phenyl-Cl$\rangle-N=\langle$N-CH_3$\rangle$ | (29) | 25 | 41 | a Literature: Rawes. D.A. (1961).—The Activity of Bephenium Hydroxynaphthoate against Hookworms in the Dog. Vet. Rec. 73 (16). 390-392.
b Literature: Theodorides. V. J. and M. Laderman (fi968).—Parbendazole in Treatment of Intestinal Nematodes of Dogs nad Monkeys. Vet. Med. 63 (10). 985.

EXAMPLE B

Hookworm test/sheep

Sheep experimentally infected with *Bunostomum trigonocephalum* were treated after the end of the pre-patent period of the parasites.

The amount of active compound was administered orally as pure active compound in gelatine capsules.

The degree of action was determined by counting the worms expelled after the treatment and the worms remaining in the test animal, after dissection, and calculating the percentage of the worms expelled.

The active compound tested, dosage used and action are summarised in the table below:

TABLE 2
Hookworm Test/Sheep

| Active compound | | Dosage, mg./kg. | Action in percent |
|---|---|---|---|
| $H_5C_2OOC-NH-\langle$phenyl$\rangle-N-\langle$N-CH_3$\rangle$ | (15) | 25 | 98 |

EXAMPLE C

Knotworm test/sheep

Sheep experimentally infected with *Oesophagostomum columbianum* were treated after the end of the pre-patent period of the parasites.

The amount of active compound was administered orally as pure active compound in gelatine capsules.

The degree of action was determined by counting the worms expelled after the treatment and the worms remaining in the test animal, after dissection, and calculating the percentage of the worms expelled.

TABLE 3
Knotworm Test/Sheep

| Active compound | | Dosage, mg./kg. | Action in percent |
|---|---|---|---|
| $H_5C_2OOC-NH-\langle$phenyl$\rangle-N-\langle$N-CH_3$\rangle$ | (15) | 5 | 92 |
| | | 25 | 96 |

In general it has proved advantageous to administer amounts of about 1 to about 100 mg. of the new compounds per kg. of body weight per day in order to achieve effective results.

Nevertheless it may at times be necessary to deviate from the amounts mentioned, and in particular to do so as a function of the body weight of the test animal or of the nature of the method of administration, but also because of the variety of animal and its individual behaviour towards the medicament or because of the nature of the formulation of the latter and the point in time, or interval, at which it is administered. Thus, it may in some cases suffice to use less than the abovementioned minimum amount, whilst in other cases the upper limit mentioned must be exceeded. Where major amounts are administered, it may be advisable to divide these into several individual administrations over the course of a day. The same dosage range is envisaged for administration in human medicine and in veterinary medicine. The general sense of the other comments made above also applies.

As stated above this invention also relates to the pharmaceutical use of the new aminophenylamidines and their salts.

Accordingly, the present invention provides a pharmaceutical composition containing as an active ingredient at least one of the new aminophenylamidines of the general Formula 1 given above, or a non-toxic salt thereof, in admixture with a pharmaceutically acceptable solid or liquid diluent or carrier as hereinafter defined.

In the present specification the expression "pharmaceutically acceptable diluent or carrier" means a non-toxic substance that when mixed with the active ingredient or ingredients renders it suitable for administration. The expression preferably excludes water and low-molecular weight organic solvents commonly used in chemical synthesis, except in the presence of other pharmaceutically necessary ingredients such as salts in correct quantities to render the composition isotonic, buffers, surfactants, colouring and flavouring agents, and preservatives. Examples of suitable solid and liquid diluents and carriers are the following:

Buffered aqueous solutions; aqueous solutions rendered isotonic with glucose or salts; non-toxic organic solvents, such as paraffins as for example petroleum fractions vegetable oils as for example groundnut and sesame oil alcohols as for example ethyl alcohol and glycerol glycols for example propylene glycol and polyethylene glycol solid excipients, such as natural ground rock as for example kaolins, aluminas, talc and chalk and synthetic rock powders as for example highly disperse silica and silicates and sugars as for example unrefined sugar, lactose and glucose. Examples of pharmaceutical compositions according to the invention are ointments, pastes, creams, sprays, lotions, aqueous suspensions, elixirs, syrups, and powders, either free-flowing or compressed into tablets.

The compounds and pharmaceutically acceptable salts of the present invention are preferably administered perorally.

One group of preferred pharmaceutical compositions of the invention are therefore those adapted for oral administration. The diluents and carriers used are preferably therefore those that adapt the active ingredient or ingredients for oral administration. Examples of such diluents and carriers are solid vehicles, excipients and lubricants such as glucose, lactose and sucrose, corn and potato starch, sodium carboxymethyl cellulose, ethyl cellulose and cellulose acetate, powdered gum tragacanth, gelatin, alginic acid, agar, stearic acid, sodium, calcium and magnesium stearates, sodium lauryl sulphate, polyvinyl-pyrollidone, sodium citrate, calcium carbonate, and dicalcium phosphate.

The pharmaceutical compositions of the invention may also contain other non-toxic adjuvants and modifiers such as dyes, surfactants as for instance emulsifiers, such as non-ionic and anionic emulisifiers (for example polyoxyethylene-fatty acid esters, polyoxyethylene-fatty alcohol ethers, alkylsulphonates and arylsulphonates), and dispersing agents (for example lignin, sulphite waste lyes, methylcellulose, starch and polyvinylpyrrolidone), perfumes, flavouring agents, preservatives and biocides.

The compounds and pharmaceutically acceptable salts of the invention can also be administered parenterally, particularly subcutaneously. A group of pharmaceutical compositions of the invention are therefore those adapted for parenteral administration, for example by injection. The diluents and carriers used are those that adapt the active ingredient for parenteral administration. Examples of such diluents and carriers are solvents and suspending diluents such as water and water-miscible organic solvents, in particular sesame oil, groundnut oil, aqueous propylene glycol, and N,N'-dimethyl formamide. Examples of pharmaceutical compositions of the invention are sterile isotonic saline aqueous solutions of the active ingredient, which may be buffered with a pharmaceutically acceptable buffer and are preferably pyrogen-free.

The pharmaceutical compositions of the invention preferably contain 0.5 to 90 wt. percent of a new aminophenylamidine of the invention or of a non-toxic salt thereof.

The present invention also provides medicaments in dosage unit form as hereinafter defined comprising as an active ingredient at least one aminophenylamidine of general Formula 1 given above or a non-toxic salt thereof, either alone or in admixture with a pharmaceutically acceptable solid or liquid diluent or carrier. In this case the diluent or carrier is preferably as defined above but can also be water or another common solvent.

The expression "medicament in dosage unit form" as used in the present specification means a medicament in the form of discrete portions each containing a unit dose or a multiple or sub-multiple of a unit dose of the active ingredient(s); for example, one, two, three or four unit doses or a half, a third or a quarter of a unit dose. A "unit dose" is the amount of the active ingredient(s) to be administered on one occasion and will usually be a daily dose, or for example a half, a third, or a quarter of a daily dose depending on whether the medicament is to be administered once or, for example, twice, three times, or four times a day.

The discrete portions constituting the medicament in dosage unit form can include a protective envelope. The active ingredient can be undiluted and contained in such an envelope, or can be mixed with a pharmaceutically acceptable solid or liquid diluent or carrier as defined above. Such portions can for example be in monolithic coherent form, such as tablets, lozenges, pills, suppositories, or dragées; in wrapped or concealed form, the active ingredients being within a protective envelope, such as wrapped powders, cachets, sachets, capsules, or ampoules; or in the form of a sterile solution suitable for parenteral injection, such as ampoules of buffered, isotonic, sterile, pyrogen-free aqueous solution; or in any other form known in the art.

As stated above, it is preferred to administer the new aminophenylamidines of general Formula 1 or their salts perorally. Preferred medicaments in dosage unit form according to the invention are therefore those adapted for oral administration, such as tablets, pills, dragées, capsules, and cachets, as well as wrapped powders containing the active ingredient in powdered form with a powdered diluent or carrier for suspension in water before being taken.

As stated above it is also possible to administer the new aminophenylamidines and salts parenterally. Another group of medicaments in dosage unit form according to the invention are therefore those adapted for parenteral injection, such as ampoules containing a measured quantity of a sterile isotonic saline injectable aqueous solution of the new active ingredient, which may be buffered with a pharmaceutically acceptable buffer and are preferably free of pyrogens.

The preferred unit dose for administration of the medicaments of the invention is 50–9000 mg. of active ingredient. This will normally be administered once daily; frequently one administration only will be necessary.

The invention further provides a method of combating helmintic infection in an animal which comprises administering to the animal (preferably parenterally or perorally) an aminophenylamidine or non-toxic salt, a pharmaceutical composition or a medicament in dosage unit form according to the invention.

What is claimed is:

1. A compound selected from the group consisting of an aminophenylcycloamidine and the physiologically acceptable acid addition salts thereof, said aminophenylcycloamidine having the formula:

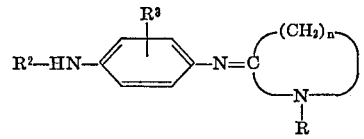

wherein $n$ has a value of 3, 4 or 5;

R is hydrogen, alkyl or alkenyl, said alkyl and alkenyl having up to 4 carbon atoms and being unsubstituted or substituted by chloro, hydroxy, or alkoxy of up to 4 carbon atoms;

$R^2$ is $R^4CO$— in which;

$R^4$ is alkoxy of up to 4 carbon atoms; and $R^3$ is hydrogen, chloro, fluoro, bromo, cyano, trifluoromethyl, nitro, alkyl of up to 4 carbon atoms, alkoxy of up to 4 carbon atoms and alkenyl of up to 4 carbon atoms.

2. A compound according to claim 1 wherein $n$ is 3; R is methyl; and $R^3$ is hydrogen, chloro or methyl.

3. The compound according to claim 1 which is 2-(4-carbethoxyaminophenylimino)-1-methylpyrrolidine.

4. The compound according to claim 1 which is 2-(4-carbomethoxyaminophenylimino)-1-methylpyrrolidine.

5. The compound according to claim 1 which is 2-(4-carbethoxyaminophenylimino)-pyrrolidine.

6. The compound according to claim 1 which is 2-(4-carbethoxyaminophenylimino)-1-ethylpyrrolidine.

7. The compound according to claim 1 which is 2-(4-carbisopropoxyaminophenylimino) - 1 - methylpyrrolidine.

8. The compound according to claim 1 which is 2-(4-carbopropoxyaminophenylimino) - 1 - methylpyrrolidine.

9. The compound according to claim 1 which is 2-(4-carbobutoxyaminophenylimino)-1-methylpyrrolidine.

10. The compound according to claim 1 which is 2-(4-carbethoxyaminophenylimino)-1-butylpyrrolidine.

11. The compound according to claim 1 which is 2-(4-carbethoxyaminophenylimino)-1-allylpyrrolidine.

12. The compound according to claim 1 which is 2-(4-carbethoxyaminophenylimino)-1-but-2-enylpyrrolidine.

13. The compound according to claim 1 which is 2-(4-carbomethoxyaminophenylimino)pyrrolidine.

14. The compound according to claim 1 which is 2-(3-methyl - 4 - carbethoxyaminophenylimino) - 1 - methylpyrrolidine.

15. The compound according to claim 1 which is 2-(3-methyl - 4 - carbobutoxyaminophenylimino) - 1 - methylpyrrolidine.

16. The compound according to claim 1 which is 2-(2-methyl-4-carbethoxyaminophenylimino)pyrrolidine.

17. The compound according to claim 1 which is 2-(3-chloro - 4 - carbethoxyaminophenylimino) - 1 - propylpyrrolidine.

18. The compound according to claim 1 which is 2-(3-chloro - 4 - carbethoxyaminophenylimino) - 1 - (3-chloroallyl)pyrrolidine.

19. The compound according to claim 1 which is 2-(3-chloro - 4 - carbethoxyaminophenylimino) - 1 - isopropylpyrrolidine.

20. The compound according to claim 1 which is 2-(3-chloro - 4 - carbethoxyaminophenylimino) - 1 - (3-methoxypropyl)pyrrolidine.

21. The compound according to claim 1 which is 2-(3-chloro - 4 - carbethoxyaminophenylimino) - 1 - methylpyrrolidine.

22. The compound according to claim 1 which is 2-(2-chloro - 4 - carbethoxyaminophenylimino) - 1 - methylpyrrolidine.

23. The compound according to claim 1 which is 2-(2-chloro - 4 - carbomethoxyaminophenylimino) - 1 - methylpyrrolidine.

24. The compound according to claim 1 which is 2-(4-carbethoxyaminophenylimino)-1-methylpiperidine.

25. The compound according to claim 1 which is 2-(4-carbethoxyaminophenylimino) - 1 - methylhexahydroazepine.

26. The compound according to claim 1 which is 2-(4-carbethoxyaminophenylimino) - 1 - (2 - hydroxyethyl)pyrrolidine.

27. The compound according to claim 1 which is 2-(4-carbethoxyphenylimino) - 1 - (2 - methylallyl)pyrrolidine.

References Cited

UNITED STATES PATENTS 3,284,465  11/1966  Scola _____ 260—326.85

JOSEPH A. NARCAVAGE, Primary Examiner

U.S. Cl. X.R.

260—239 B, 243 A, 250 R, 256.4 R, 287 R, 293.73, 293.74, 293.75, 293.77, 295 AM, 295.5 A, 302 H, 309, 307 H, 310 R, 326.14 R, 326.3, 326.82, 327 TH; 424—244, 247, 250, 251, 258, 263, 266, 267, 270, 272, 273, 274, 275